United States Patent [19]
Bailer et al.

[11] Patent Number: 5,861,598
[45] Date of Patent: Jan. 19, 1999

[54] WIRE SUPPLY DEVICE ON A MACHINE FOR SPARK EROSION OF WORKPIECES

[76] Inventors: Norbert Bailer, Aispenweg 7; Peter Bailer, Lilienstrasse 26, both of 88433 Schemmerhofen, Germany

[21] Appl. No.: 875,460
[22] PCT Filed: May 9, 1996
[86] PCT No.: PCT/EP96/01969
§ 371 Date: Jul. 28, 1997
§ 102(e) Date: Jul. 28, 1997
[87] PCT Pub. No.: WO96/35545
PCT Pub. Date: Nov. 14, 1996

[30] Foreign Application Priority Data

May 11, 1995 [DE] Germany .......................... 195 17 370.8

[51] Int. Cl.⁶ ........................................... B23H 7/10
[52] U.S. Cl. ............................................. 219/69.12
[58] Field of Search ............................... 219/69.12

[56] References Cited

U.S. PATENT DOCUMENTS

| | | | |
|---|---|---|---|
| 4,242,556 | 12/1980 | Ullmann et al. | 219/69.12 |
| 4,386,248 | 5/1983 | Inoue | 219/69.12 |
| 5,281,787 | 1/1994 | Arakawa . | |

FOREIGN PATENT DOCUMENTS

| | | |
|---|---|---|
| 89 12 810 U1 | 2/1990 | Germany . |
| 41 15 107 | 11/1992 | Germany . |
| 58-109227 A | 6/1983 | Japan . |
| 63-235269 A | 9/1988 | Japan . |
| 3-239420 A | 10/1991 | Japan . |
| 7-001247 A | 1/1995 | Japan . |

Primary Examiner—Geoffrey S. Evans
Attorney, Agent, or Firm—Clifford W. Browning; Woodard, Emhardt, Naughton, Moriarty & McNett Patent and Trademark Attorneys

[57] ABSTRACT

An electrode wire (20) is withdrawn from a pay-off spool (22), passed around guide rolls (24–30) to a machining span (32), and finally wound up on a take-up spool (40). The electrode wire (20) is guided in such a way that it always moves in the same plane at right angles to the axes, both when being wound up on the take-up spool (40) and when being unwound from the pay-off spool (22). Both spools (22, 40) are supported on a common carrier member (50) which is displaceable in axial direction of the spools (22, 40). A measuring device (70) is disposed between the pay-off spool (22) and the first guide roll (24) to detect deviations of the position of the electrode wire (20) from a predetermined position. The carrier member (50) is connected to a slide drive (60) which corrects any deviation detected of the position of the electrode wire (20) being unwound from the pay-off spool (22) by axially shifting the carrier member (50). Thus it also makes sure that the spent electrode wire (20) is wound up properly on the take-up spool (40).

12 Claims, 4 Drawing Sheets

WIRE SUPPLY DEVICE ON A MACHINE FOR SPARK EROSION OF WORKPIECES

The instant invention relates to a wire supply device on a machine for spark erosion of workpieces, comprising an electrode wire which is withdrawn from a pay-off spool and passed around guide rolls to a machining span, the pay-off spool being rotatably supported on a pivot pin, the pivot pin being fastened to a carrier member which is displaceable in axial direction of the pay-off spool, a measuring means being provided between the pay-off spool and the first guide roll to detect deviations of the position of the electrode wire from a predetermined position, and the carrier member being connected to a slide drive means which corrects any deviation detected of the position of the electrode wire being unwound from the pay-off spool by axially shifting the carrier member.

BACKGROUND OF THE INVENTION

In the case of a known wire supply device of this kind (DE 89 12 810 U1) the axial slidability of the pay-off spool containing a wire supply is based on the finding that oscillations may be induced at the guide roll which immediately follows the pay-off spool, and these oscillations may be transmitted to the machining span where they may affect the accuracy to size and the surface quality of the workpieces being processed. When the pay-off spool is supported so as not to be movable axially, such oscillations are caused by the fact that the electrode wire, arranged in layers on the spool, is payed off at a different angle at the beginning of each layer than at the end of the layer. From a certain angle on, the electrode wire tends to move up periodically on flanks of a groove formed in the guide roll which receives the wire next down the line from the pay-off spool and then to slide down again into the bottom of the groove. With the known device of the generic kind in question this is prevented by controlled shifting of the pay-off spool so that the electrode wire constantly maintains a certain position at which it runs perpendicularly to the axis of the pay-off spool.

It is also known (JP 07 001 247 A) to wind up spent electrode wire on a take-up spool for disposal, causing the spool to carry out controlled axial reciprocating movements during the winding process in order to make full use of the winding space available.

SUMMARY OF THE INVENTION

The invention starts from the finding that oscillations may be generated also during the winding up of the used electrode wire and that these oscillations may propagate as far as the machining span where they may affect the accuracy to size and surface quality of the workpiece being processed.

It is the object of the invention to prevent such oscillations as well.

This object is met, in accordance with the invention, in a wire supply device of the kind specified initially by the fact that a take-up spool for winding up the used electrode wire is supported on a second pivot pin, the second pivot pin is fastened to the carrier member in parallel with the first pivot pin, both spools are axially fixed with respect to their own pivot pins, and the electrode wire is guided in such manner that it always moves in the same plane normal to the axes when being wound up on the take-up spool and also when being unwound from the pay-off spool.

As a result, the electrode wire is wound up on the take-up spool in the same layered fashion as it was wound originally on the pay-off spool. The original wound configuration of the electrode wire on the pay-off spool thus is reproduced on the take-up spool by the mere fact that the measuring means which monitors only the unwinding electrode wire effects control of the common carrier member of both spools. In this manner the electrode wire is prevented from slipping off a previously laid wire winding on the take-up spool and thereby starting to oscillate.

The device according to the invention preferably is developed further by providing that the measuring means comprises a measuring roll which is supported in parallel with the axis of the pay-off spool for free axial movement and has an annular groove to guide the electrode wire, and that the measuring means further comprises sensors which emit signals for correction to the slide drive means when the measuring roll deviates from a normal axial position.

The sensors preferably are inductive proximity switches.

It is of advantage if the slide drive means comprises a servo motor and a spindle drive.

Finally, it is convenient if the two spools are connected to a motor each, mounted on the carrier member, and acting so as to drive the take-up spool and retard the pay-off spool, both motors being controlled so that the electrode wire is kept under essentially constant tension.

BRIEF DESCRIPTION OF THE DRAWING FIGURES

The invention will be described further, by way of an example with reference to the accompanying drawings, in which.

DETAILED DESCRIPTION OF THE PREFERRED EMBODIMENT

Figure 1:
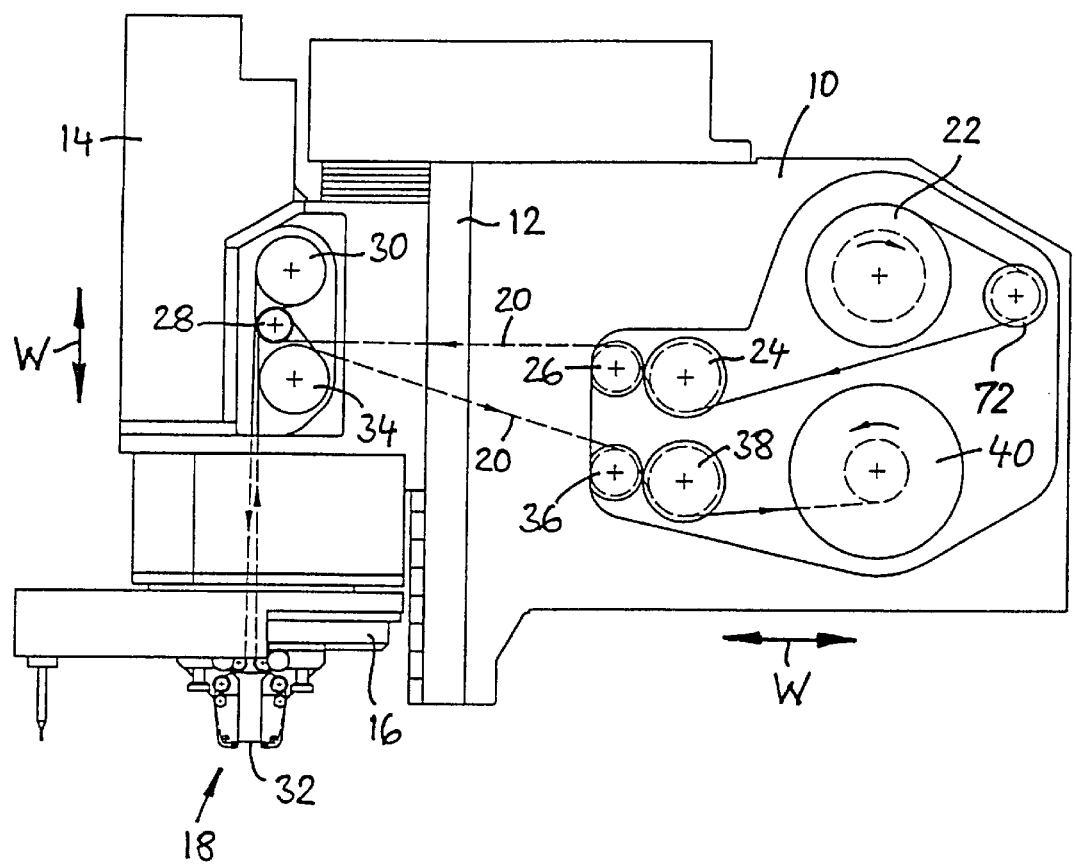
FIG. 1 is a side elevation of a spark erosion machine comprising a device according to the invention.
Figure 2:
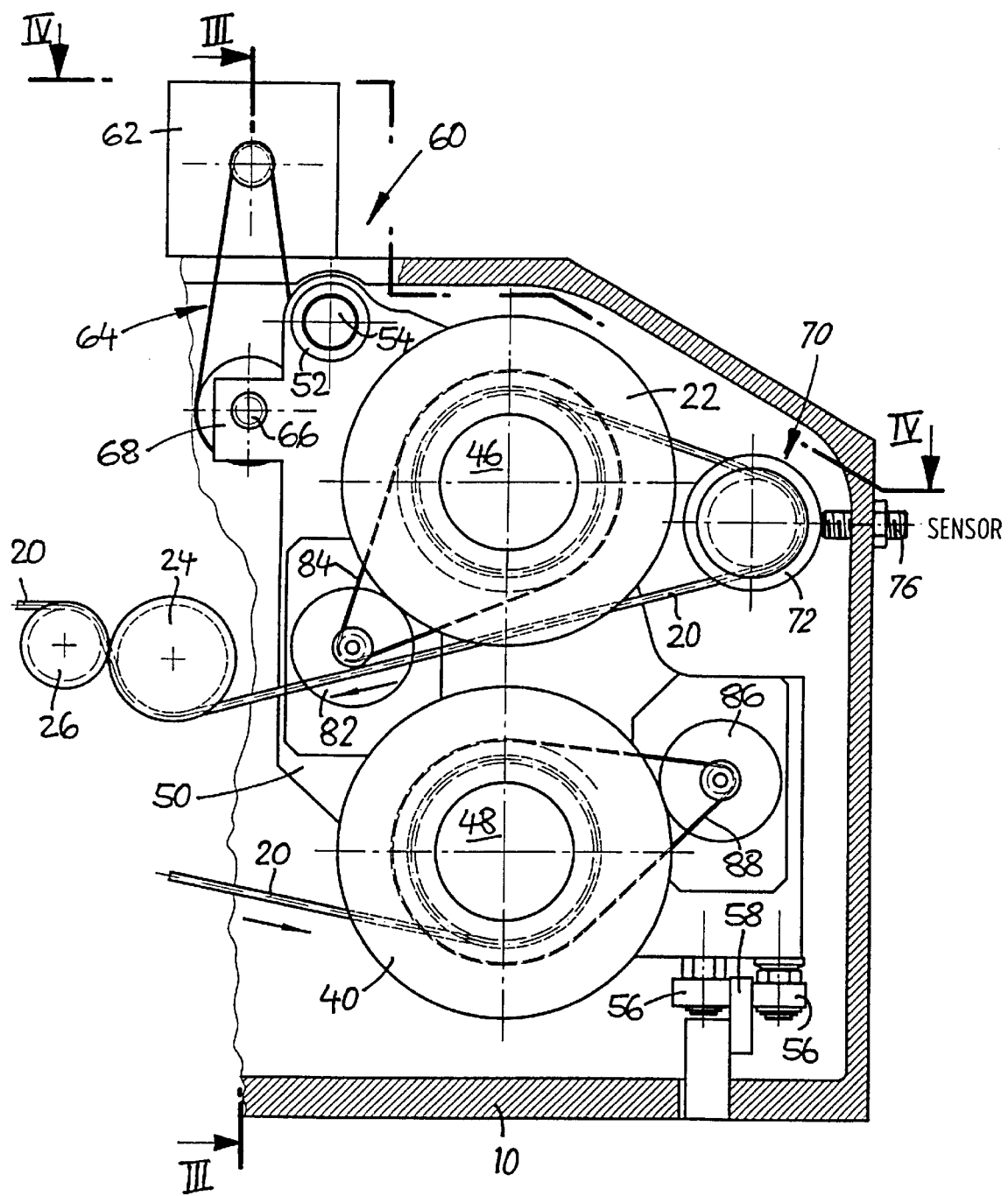
FIG. 2 is an enlarged cutout of FIG. 1.

The device illustrated in the drawing comprises a casing 10 which is movable under numerical control along a horizontal axis Y, such as is customary with erosive machinery (e.g. DE 41 15 107 C2). The casing 10 is formed with a guide means 12 to guide a carriage 14 which is movable under numerical control along a vertical axis W. The carriage 14 carries a tool head 16 which is rotable about a vertical axis E, while being controlled numerically too. A fork-shaped wire holder 18 for an electrode wire 20 is fastened to the tool head 16.

Below the tool head 16, a tool support is arranged for vertical sliding movement and rotational movement about a horizontal axis in a manner known from DE 41 15 107 C2, for example, and therefore not shown in the drawing.

The electrode wire 20 is supplied from a pay-off spool 22 on which it is wound in conventional manner in closely adjacent windings layered on top of each other. Guide rolls 24 and 26 are supported at the casing in parallel with the pay-off spool 22. The electrode wire 20 first passes around the guide rolls 24 and 26, then around guide rolls 28 and 30 which are supported at the carriage 14, and next, while being guided by further guide rolls, the electrode wire 20 travels substantially vertically downwards to the wire holder 18 where it passes through a machining span 32 in the center of which it crosses the axis of rotation E. From the machining span 32, the electrode wire 20 moves around another guide roll 34 supported at the carriage 14 and finally around guide rolls 36 and 38 which are supported at the casing 10 with their axes parallel to the axes of the guide rolls 24 and 26, travelling on to a take-up spool 40 which is supported below and paraxial with the pay-off spool 22.

The pay-off spool 22 and the take-up spool 40 each are supported on a pivot pin 42 and 44, respectively. However, in operation a respective locking screw 46 or 48 prevents them from becoming axially displaced with respect to the corresponding pivot pin. The locking screws 46 and 48 are loosened only for exchanging the pay-off spool 22 and the take-up spool 40, respectively. The two pivot pins 42 and 44 are fastened horizontally and parallel to each other at a carrier member 50 in such a way that the winding spaces of the two spools 22 and 40 are located directly above each other. The carrier member 50 is embodied by a vertical plate and is guided by a guide bushing 52 fixed to it on a horizontal guide rod 54 which is secured to the casing 10. Rotation of the carrier member 50 about the guide rod 54 is prevented by two guide rolls 56, each rotatably supported on a corresponding vertical axis on the carrier member, at the greatest possible distance from the guide rod 54. Parallel to the guide rod 54, a guide bar 58 is fixed to the casing 10 between the two guide rolls 56.

A slide drive means 60 is coordinated with the carrier member 50 and controlled in such manner that the electrode wire 20 always is advanced to the guide rolls 24 and 26 at right angles to the axes of rotation thereof and is wound on the take-up spool 40 in the same closely adjacent windings, super-positioned in layers, as it was withdrawn from the pay-off spool 22. The slide drive means 60 comprises a servo motor 62 connected by a belt drive means 64 to a threaded spindle 66 which is disposed in parallel with the axes of rotation of the pay-off and take-up spools 22 and 40, respectively. Together with a threaded nut 68 formed in the carrier member 50, the threaded spindle 66 presents a thread drive means which is free from play. Consequently, the position of the carrier member 50 and thus also the positions of the pay-off spool 22 and take-up spool 44 can be controlled with great precision by means of the servo motor 62.

The slide drive means 60 forms part of a control circuit which also includes a measuring means 70 with a measuring roll 72. The measuring roll 72 is supported on a pivot pin 74 parallel to the pivot pins 42 and 44 so as to be freely rotatable and freely movable in axial direction. Any axial shifting of the measuring roll 72 on the pivot pin 74 is monitored by sensors 76 and 78 which are secured to the casing 10.

Rotation of the spools 22 and 40 is controlled by a rotary drive control means 80 in such a manner that the electrode wire 20 is kept under substantially constant tension at all times. The control means 80 controls both a motor 82 which normally acts via a belt drive arrangement 84 on the pay-off spool 22 so as to retard it, and a motor 86 which normally acts via a belt drive arrangement 88 on the take-up spool 40 so as to propel the latter. As both motors 82 and 86 are secured to the carrier member 50, they take part in the movements of the latter in the direction of the axes of both spools 22 and 40.

Figure 3:
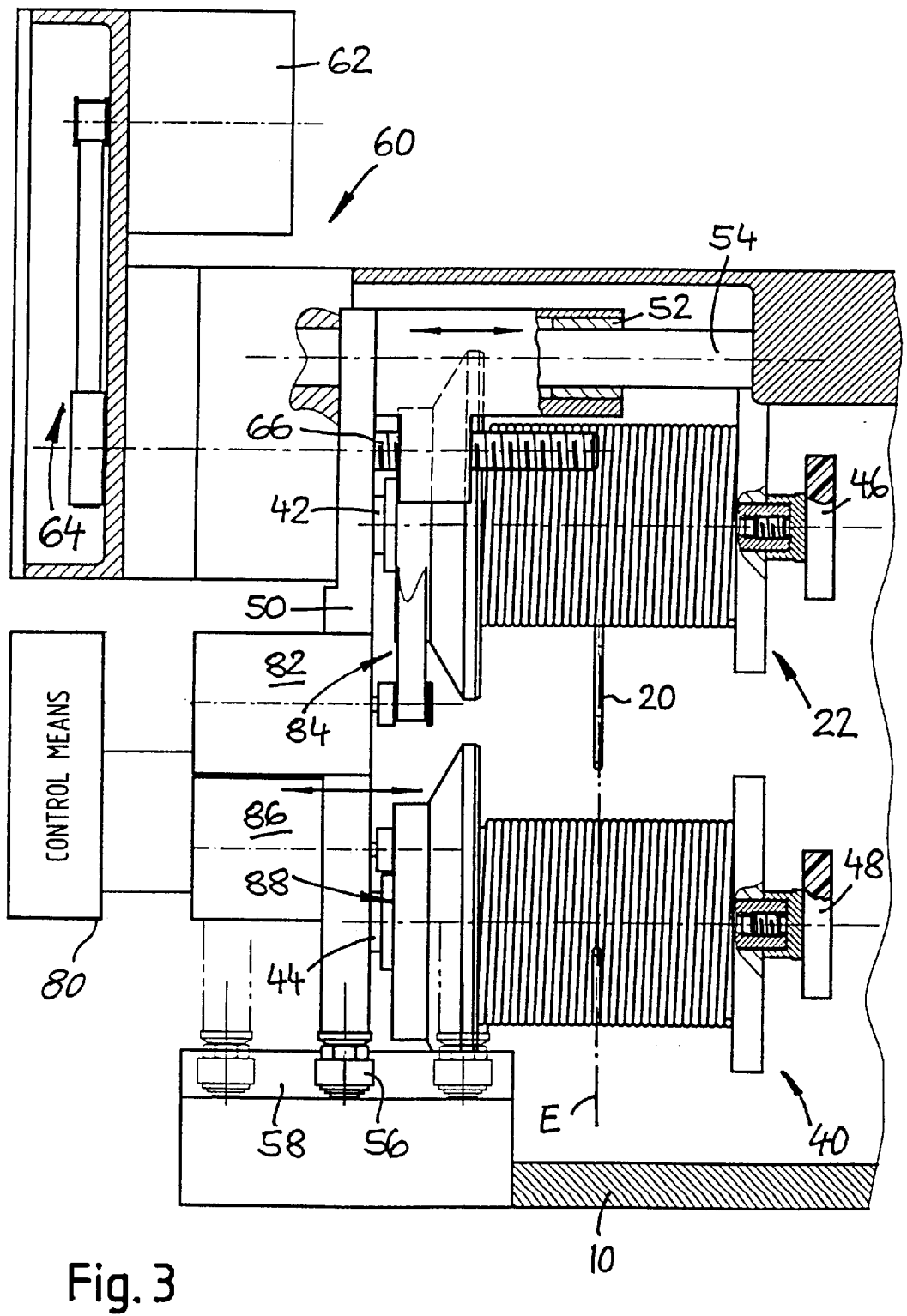
FIG. 3 is a vertical section along line III—III of FIG. 2.
Figure 4:
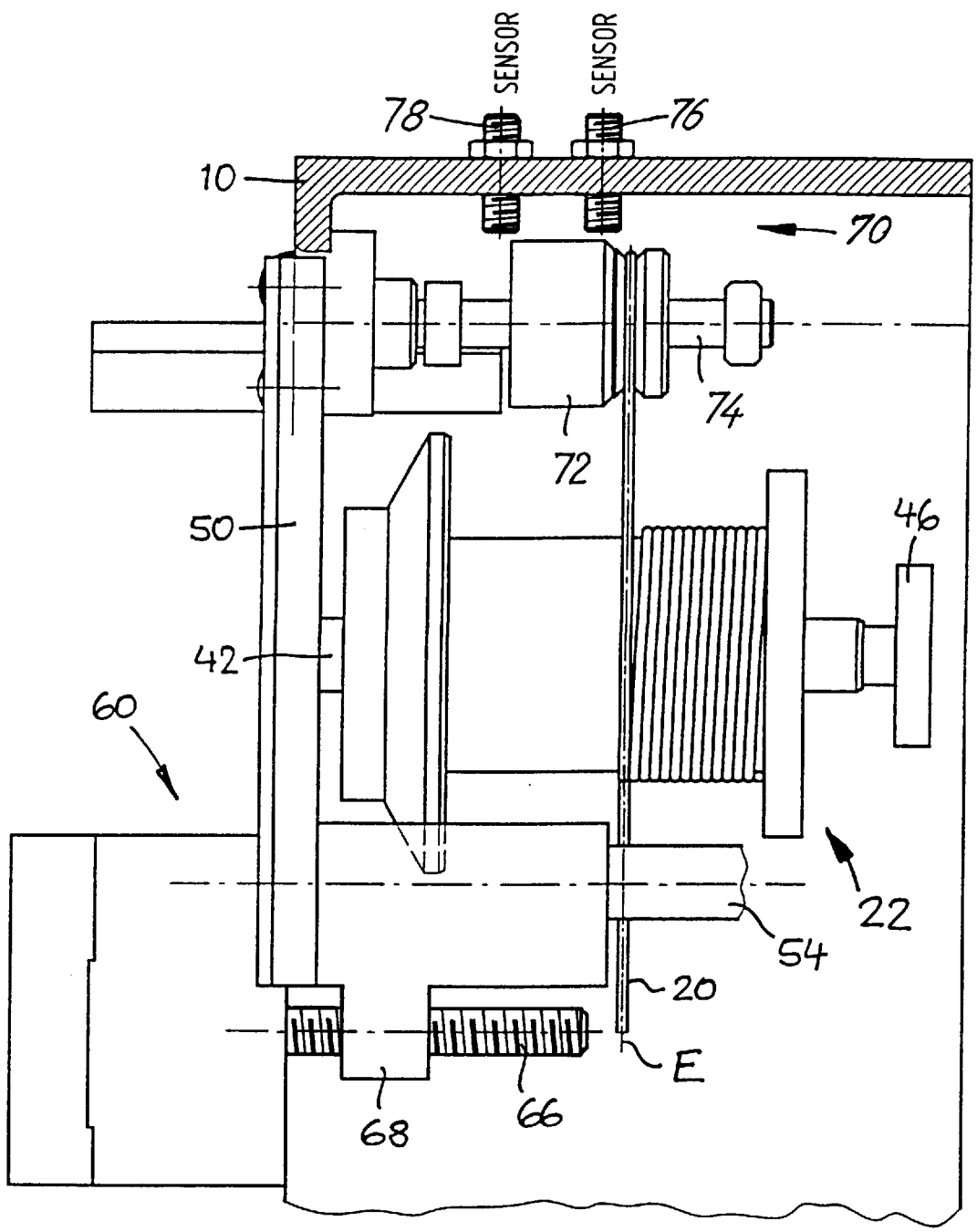
FIG. 4 is a horizontal section along line IV—IV of FIG. 2.

Before reaching the guide rolls 24 and 26, the electrode wire 20 coming from the pay-off spool 22 travels through an annular groove of V-shaped cross section formed in the measuring roll 72. Therefore, the position of the measuring roll on the pivot pin 74 is variable by axial force exerted by the electrode wire 20 on the measuring roll 72. This axial force is of zero magnitude only when the electrode wire 20 is travelling in a plane which is perpendicular to the axes of rotation of the pay-off spool 22 and the two guide rolls 24 and 26, i.e. vertical in the example shown. Any deviation from this desired condition will cause axial displacement of the measuring roll 72 on its pivot pin 74 and, as a result thereof, one or the other sensor 76 or 78, depending on the direction of the axial shifting, will emit a signal to the servo motor 62 causing it to rotate in one or the other direction in order to reestablish the desired condition. It may be taken from FIGS. 3 and 4 that the carrier member 50 is shifted back and forth along the guide rod 54 as the individual wire layers formed by the electrode wire 20 wound on the pay-off spool 22 are being used up. The distance by which the carrier member 50 including the pay-off spool 22 and the take-up spool 40 is being reciprocated is commensurate with the width of the winding space of these spools.

As a result of the joint displacement of the two spools 22 and 40, the electrode wire 20 being wound up on the take-up spool 40 always moves in the same plane E, which is vertical in the embodiment illustrated here, as it leaves the pay-off spool 22. In this manner any tendency is prevented that the electrode wire 20 might climb up on the lateral limitations of the groove guiding it around the guide roll 24 or the successive guide rolls. On the other hand, the electrode wire 20 is wound on the take-up spool 40 in windings which are just as closely placed next to and on top of each other as they were on the pay-off spool 22. The orderly arrangement of the electrode wire as usually originating from the wire manufacturer thus is copied, so to speak, on the take-up spool 40. For this reason, the electrode wire has no chance, either on the take-up spool 40 or on the pay-off spool 22, to slip off a wire winding or get caught between two wire windings, thereby inducing oscillations.

We claim:

1. A wire supply device on a machine for spark erosion of workpieces, comprising an electrode wire (20) which is withdrawn from a pay-off spool (22) and passed around guide rolls (24–30) to a machining span (32), the pay-off spool (22) being rotatably supported on a pivot pin (42), the pivot pin (42) being fastened to a carrier member (50) which is displaceable in axial direction of the pay-off spool (22), a measuring means (70) to detect deviations of the position of the electrode wire (20) from a predetermined position being provided between the pay-off spool (22) and the first guide roll (24), the carrier member (50) being connected to a slide drive means (60) to correct any deviation detected of the position of the electrode wire (20) being unwound from the pay-off spool (22) by axially shifting the carrier member (50), a take-up spool (40) for winding up the electrode wire (20) supported on a second pivot pin (44), the second pivot pin (44) fastened to the carrier member (50) in parallel with the first pivot pin, and both spools (22, 40) are axially fixed with respect to their own pivot pins (42, 44), whereby the electrode wire (20) is guided in such manner that it always moves in the same plane normal to the axes when being wound up on the take-up spool (40) and also when being unwound from the pay-off spool (22).

2. The device as claimed in claim 1, wherein the measuring means (70) comprises a measuring roll (72) which is supported for free axial movement and in parallel with the axis of the pay-off spool (22) and has an annular groove to guide the electrode wire (20), and the measuring means (70) further comprises sensors (76, 78) which emit signals for correction to the slide drive means (60) when the measuring roll (72) deviates from a normal axial position.

3. The device as claimed in claim 2, characterized in that the two spools (22, 40) are connected to a motor (82, 86) each, arranged on the carrier member (50) and acting so as to drive the take-up spool (40) but to retard the pay-off spool (22), both motors (82, 86) being controlled so that the electrode wire (20) is kept under essentially constant tension.

4. The device as claimed in claim 2, characterized in that the slide drive means (60) comprises a servomotor (62) and a threaded spindle (66).

5. The device as claimed in claim 4, characterized in that the two spools (22, 40) are connected to a motor (82, 86) each, arranged on the carrier member (50) and acting so as to drive the take-up spool (40) but to retard the pay-off spool (22), both motors (82, 86) being controlled so that the electrode wire (20) is kept under essentially constant tension.

6. The device as claimed in claim 2, wherein the sensors (76, 78) are inductive proximity switches.

7. The device as claimed in claim 6, characterized in that the slide drive means (60) comprises a servomotor (62) and a threaded spindle (66).

8. The device as claimed in claim 7, characterized in that the two spools (22, 40) are connected to a motor (82, 86) each, arranged on the carrier member (50) and acting so as to drive the take-up spool (40) but to retard the pay-off spool (22), both motors (82, 86) being controlled so that the electrode wire (20) is kept under essentially constant tension.

9. The device as claimed in claim 6, characterized in that the two spools (22, 40) are connected to a motor (82, 86) each, arranged on the carrier member (50) and acting so as to drive the take-up spool (40) but to retard the pay-off spool (22), both motors (82, 86) being controlled so that the electrode wire (20) is kept under essentially constant tension.

10. The device as claimed in claim 1, characterized in that the slide drive means (60) comprises a servomotor (62) and a threaded spindle (66).

11. The device as claimed in claim 10, characterized in that the two spools (22, 40) are connected to a motor (82, 86) each, arranged on the carrier member (50) and acting so as to drive the take-up spool (40) but to retard the pay-off spool (22), both motors (82, 86) being controlled so that the electrode wire (20) is kept under essentially constant tension.

12. The device as claimed in claim 1, characterized in that the two spools (22, 40) are connected to a motor (82, 86) each, arranged on the carrier member (50) and acting so as to drive the take-up spool (40) but to retard the pay-off spool (22), both motors (82, 86) being controlled so that the electrode wire (20) is kept under essentially constant tension.

* * * * *

UNITED STATES PATENT AND TRADEMARK OFFICE
CERTIFICATE OF CORRECTION

PATENT NO. : 5,861,598
DATED : January 19, 1999
INVENTOR(S) : Norbert Bailer et al.

It is certified that error appears in the above-indentified patent and that said Letters Patent is hereby corrected as shown below:

In column 4, line 63, please insert --(42)--, after "Pin".

Signed and Sealed this

Second Day of November, 1999

Attest:

Q. TODD DICKINSON

*Attesting Officer*    *Acting Commissioner of Patents and Trademarks*